United States Patent
Kwon et al.

(10) Patent No.: US 9,817,240 B2
(45) Date of Patent: Nov. 14, 2017

(54) GLASS PATTERNED RETARDER STEREOSCOPIC 3D DISPLAY DEVICE AND METHOD OF FABRICATING THE SAME

(71) Applicant: LG DISPLAY CO., LTD., Seoul (KR)

(72) Inventors: Dhang Kwon, Paju (KR); MyoungHo Lee, Seoul (KR); HangSup Cho, Paju (KR); Junghyun Lee, Goyang (KR)

(73) Assignee: LG DISPLAY CO., LTD., Seoul (KR)

( * ) Notice: Subject to any disclaimer, the term of this patent is extended or adjusted under 35 U.S.C. 154(b) by 664 days.

(21) Appl. No.: 13/682,427

(22) Filed: Nov. 20, 2012

(65) Prior Publication Data

US 2013/0135723 A1   May 30, 2013

(30) Foreign Application Priority Data

Nov. 30, 2011  (KR) .......... 10-2011-0127159

(51) Int. Cl.
   *G02B 27/26*   (2006.01)
(52) U.S. Cl.
   CPC ......... *G02B 27/26* (2013.01); *Y10T 29/49885* (2015.01)
(58) Field of Classification Search
   CPC  G02B 27/22; G02B 27/2207; G02B 27/2235; G02B 27/2228; G02B 27/26; G02B 27/28; G02B 27/2214; G02B 27/225; G02F 1/1333; H04N 13/0409; H04N 13/0422
   USPC .............. 359/462–467, 477; 349/15, 106
   See application file for complete search history.

(56) References Cited

U.S. PATENT DOCUMENTS

| | | |
|---|---|---|
| 2005/0117093 A1 | 6/2005 | Kim et al. |
| 2005/0219443 A1 | 10/2005 | Tanaka et al. |
| 2005/0225691 A1* | 10/2005 | Yi ..................... G02F 1/134309 349/44 |
| 2010/0053518 A1 | 3/2010 | Jeong et al. |
| 2010/0182557 A1 | 7/2010 | You et al. |
| 2010/0238097 A1 | 9/2010 | Baik et al. |
| 2010/0259712 A1 | 10/2010 | Jeong et al. |
| 2010/0289884 A1* | 11/2010 | Kang ............................. 348/58 |
| 2010/0308332 A1* | 12/2010 | Ono ...................... H05B 33/28 257/59 |
| 2011/0149218 A1* | 6/2011 | Nakayama .............. B32B 37/02 349/106 |

(Continued)

FOREIGN PATENT DOCUMENTS

| | | |
|---|---|---|
| CN | 1624548 A | 6/2005 |
| CN | 1680833 A | 10/2005 |
| CN | 101825824 A | 9/2010 |

(Continued)

*Primary Examiner* — Darryl J Collins
*Assistant Examiner* — Journey Sumlar
(74) *Attorney, Agent, or Firm* — Birch, Stewart, Kolasch & Birch, LLP (57) ABSTRACT

Discussed are a glass patterned retarder stereoscopic 3D display device and a method for fabricating the same. The device is capable of enhancing a viewing angle in upper and lower directions and an aperture ratio by forming light shielding patterns on a rear surface of a color filter substrate. Further, the device is capable of preventing scratches occurring on the light shielding patterns due to a polishing belt, by forming high hardness polymer on the light shielding patterns and removing stair-steps of a rear indium tin oxide (ITO).

16 Claims, 9 Drawing Sheets

(56) References Cited

U.S. PATENT DOCUMENTS

2012/0326590 A1* 12/2012 Park ...................... G02B 27/26
                                                    313/112
2013/0314781 A1* 11/2013 Jang ..................... G02B 5/3083
                                                    359/465

FOREIGN PATENT DOCUMENTS

| CN | 101840073 A | 9/2010 |
| CN | 101859044 A | 10/2010 |

* cited by examiner

GLASS PATTERNED RETARDER STEREOSCOPIC 3D DISPLAY DEVICE AND METHOD OF FABRICATING THE SAME

CROSS-REFERENCE TO RELATED APPLICATION

Pursuant to 35 U.S.C. §119(a), this application claims the benefit of earlier filing date and right of priority to Korean Application No. 10-2011-0127159, filed on Nov. 30, 2011, the contents of which is incorporated by reference herein in its entirety.

BACKGROUND OF THE INVENTION

1. Field of the Invention

The present disclosure relates to a glass patterned retarder stereoscopic 3D display device, and particularly, to a glass patterned retarder stereoscopic 3D display device capable of allowing a user to view 3D images using polarized glasses, and a method for fabricating the same.

2. Related Art of the Invention

A 3D display device may be referred to as a total system for implementing a 3D screen.

The system includes software technique for displaying contents in a 3D manner, and hardware technique for implementing contents generated by software in a 3D manner. The reason why the system includes software technique is because 3D display hardware requires contents by additional software according to each 3D implementation method.

A virtual 3D display refers to a total system capable of allowing a viewer to virtually perceive a 3D effect, from a planar display hardware, using a binocular disparity resulting from that human's eyes are spaced from each other by a distance of about 65 mm. More specifically, the viewer's eyes recognize different images (images having left and right spatial information) due to a binocular disparity. Once the two different images are transferred to the viewer's brain through retinas, the brain precisely combines them to allow the viewer to perceive a 3D effect. Here, a 2D display device simultaneously displays right and left images to form a virtual stereoscopic effect through designs for right and left eyes, which is a virtual 3D display.

In order for the virtual 3D display device to display images from two channels on a single screen, the images are output from the channels one by one in an alternating manner in a horizontal or vertical direction on a single screen. Once the two images from the two channels are output from a single display device, a right image is input to the right eye and a left image is input to the left eye in case of a auto-stereoscopic method due to a hardware structure. In case of a stereoscopic method using glasses, a right image is blocked so as not to be viewed by the left eye, and a left image is blocked so as not to be viewed by the right eye, by using specific glasses.

A method for displaying 3D images is categorized into the stereoscopic method using glasses, and the auto-stereoscopic method.

The stereoscopic method includes an anaglyph method using red/cyan glasses at left and right sides, respectively, a patterned retarder stereoscopic method using polarized glasses having different right and left polarizing directions, a shutter glasses method using liquid crystal (LC) shutter glasses synchronized with a period and for periodically repeating a time-divided image, etc. Among such methods, the patterned retarder stereoscopic method has an advantage that a 3D image can be easily implemented from two 2D images.

Figure 1:
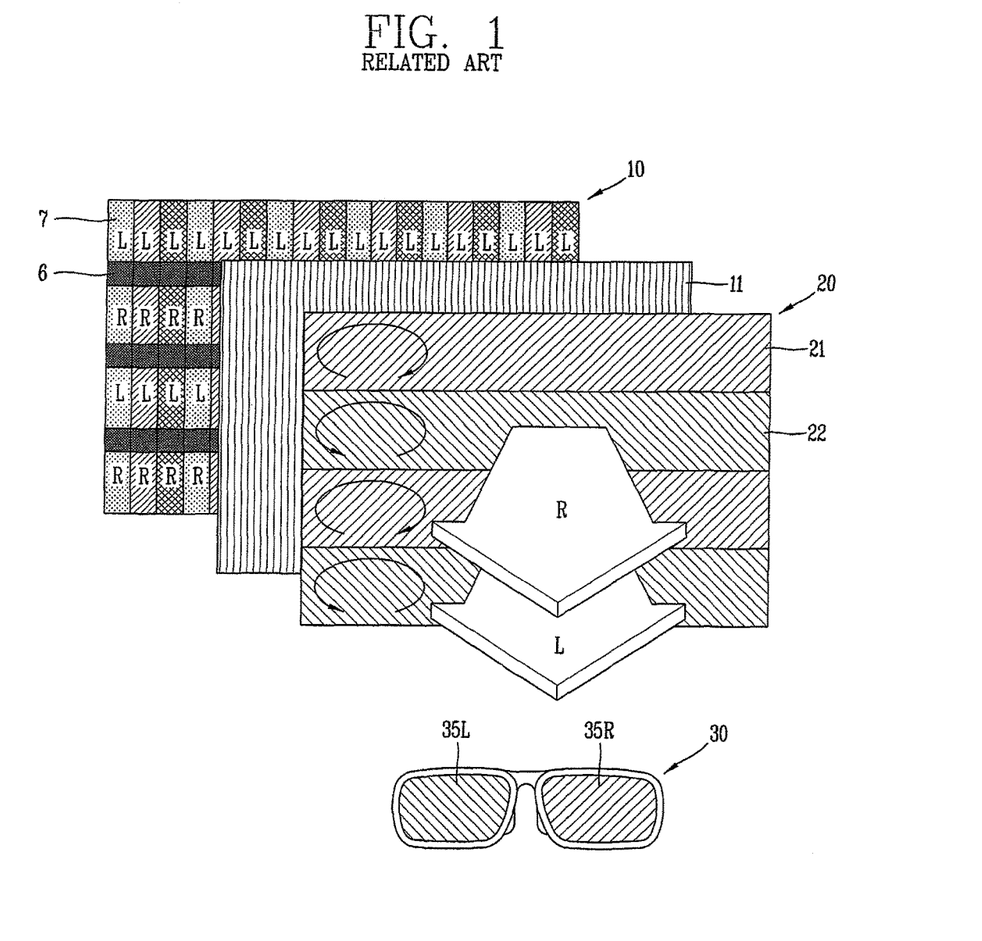
FIG. 1 is an exemplary view schematically showing a structure of a patterned retarder stereoscopic 3D display device in accordance with the related art.
Figure 2:
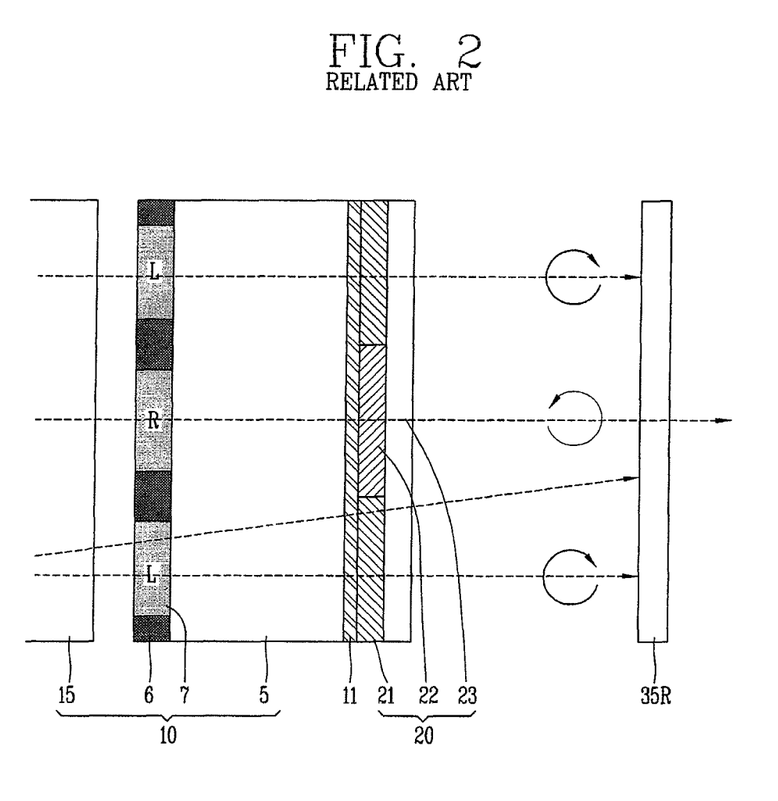
FIG. 2 is a sectional view schematically showing a structure of a patterned retarder stereoscopic 3D display device in accordance with the related art.

FIG. 1 is an exemplary view schematically showing a structure of a patterned retarder stereoscopic 3D display device in accordance with the related art, and FIG. 2 is a sectional view schematically showing a structure of a patterned retarder stereoscopic 3D display device in accordance with the related art.

Referring to FIGS. 1 and 2, the patterned retarder stereoscopic 3D display method is a method for spatially separating right and left images from each other by arranging a patterned retarder 20 on a front surface of an image panel 10, using a polarization phenomenon.

The patterned retarder 20 indicates a film where predetermined patterns are formed at corresponding positions so that right and left images can implement polarization states perpendicular to each other.

For instance, the patterned retarder 20 is provided with a glass substrate 23. Although not shown, an alignment layer and a bi-refractive layer are formed on the glass substrate 23. The alignment layer and the bi-refractive layer are provided with regular patterns of a first region 21, and regular patterns of a second region 22. The first region 21 and the second region 22 are formed of strips alternating each other in correspondence to image lines of the image panel 10. The first and second regions 21 and 22 have the same alignment direction.

In case of implementing an LCD device as the image panel 10, a polarizing plate 11 having a light absorbing axis in a horizontal direction is disposed between the image panel 10 and the patterned retarder 20.

Here, the image panel 10 may include upper and lower glass substrates 5 and 15, and an LC layer formed between the upper and lower glass substrates 5 and 15. A thin film transistor (TFT) is formed on the lower glass substrate 15, and a color filter array is formed on the upper glass substrate 5. The color filter array includes a black matrix 6, a color filter 7, etc.

A widely-used 3D display method is a method for displaying right and left images on pixels on odd and even lines, or on even and odd lines, respectively. That is, as shown, 'L' images are disposed in odd lines and 'R' images are disposed in even lines in a vertical direction. Once the 'L' and 'R' images are displayed on the image panel 10, a viewer can appreciate 3D images by separately viewing the 'L' and 'R' images using 3D glasses 30.

In the patterned retarder stereoscopic method, since the 'L' images and the 'R' images come in contact with each other, the viewer cannot separately view the 'L' and 'R' images from each other using left and right lens 35L and 35R of the 3D glasses 30. This may cause crosstalk that the 'R' images are input to the left eye and the 'L' images are input to the right eye, or may cause a viewing angle limited in upper and lower directions.

To solve such problems, a width of the black matrix 6 of the upper glass substrate 5 was increased. However, in this case, an aperture ratio may be lowered in proportion to the increased width of the black matrix 6.

SUMMARY OF THE INVENTION

Therefore, an aspect of the detailed description is to provide a glass patterned retarder stereoscopic 3D display device capable of enhancing a viewing angle in upper and lower directions, and capable of enhancing an aperture ratio by forming light shielding patterns on a rear surface of a color filter substrate, and a method for fabricating the same.

Another aspect of the detailed description is to provide a glass patterned retarder stereoscopic 3D display device capable of preventing scratches of light shielding patterns due to a polishing belt, and a method for fabricating the same.

To achieve these and other advantages and in accordance with the purpose of this specification, as embodied and broadly described herein, there is provided a glass patterned retarder stereoscopic 3D display device, comprising: an image panel formed as a color filter substrate and an array substrate are attached to each other, and configured to display right and left images on pixels on odd and even lines, or on even and odd lines, respectively; light shielding patterns formed, in the form of a belt, on a rear surface of the color filter substrate between pixels adjacent to each other in upper and lower directions; a passivation layer formed of polymer, on an entire surface of the color filter substrate having thereon the light shielding patterns; a rear indium tin oxide (ITO) formed on an entire surface of the passivation layer; a polarizing plate attached onto the rear ITO; and a patterned retarder attached onto the polarizing plate, and configured to spatially separate right and left images from each other, the right and left images displayed through the image panel.

The passivation layer may be formed of high hardness polymer including siloxane.

The passivation layer may be formed in a thickness of 1.5 μm~5.0 μm, such that the surface of the upper glass substrate having thereon the light shielding patterns is planarized.

The light shielding patterns may be configured as resin black matrixes in a thickness of 0.25 μm~1.5 μm.

The light shielding patterns may be formed of metallic material selected from a group including Cr, Fe, Co, Ta, Mo and MoTi.

The light shielding patterns may be formed in a thickness of 300 Å~1000 Å.

To achieve these and other advantages and in accordance with the purpose of this specification, as embodied and broadly described herein, there is also provided a method for fabricating a glass patterned retarder stereoscopic 3D display device, the method comprising: forming light shielding patterns on another surface of a color filter substrate, the color filter substrate having color filters on one surface thereof; forming a passivation layer of polymer, on an entire surface of the color filter substrate having the light shielding patterns formed thereon; forming a rear indium tin oxide (ITO) on an entire surface of the passivation layer; attaching the color filter substrate having the rear ITO formed thereon, to an array substrate, thereby forming an image panel which displays right and left images on pixels on odd and even lines, or on even and odd lines, respectively; attaching a polarizing plate onto the rear ITO of the color filter substrate of the image panel; and attaching a patterned retarder onto the polarizing plate, the patterned retarder configured to spatially separate right and left images from each other, the right and left images displayed through the image panel.

The light shielding patterns may be formed on the rear surface of the color filter substrate, in the form of a belt, between pixels adjacent to each other in upper and lower directions.

The passivation layer may be formed of high hardness polymer including siloxane.

The passivation layer may be formed in a thickness of 1.5 μm~5.0 μm, such that the surface of the upper glass substrate having thereon the light shielding patterns is planarized.

The light shielding patterns may be implemented as resin black matrixes in a thickness of 0.25 μm~1.5 μm.

The light shielding patterns may be formed of metallic material selected from a group including Cr, Fe, Co, Ta, Mo and MoTi, each having 5 H~10 H based on the Mohs hardness.

The light shielding patterns may be formed in a thickness of 300 Å~1000 Å.

Further scope of applicability of the present application will become more apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from the detailed description.

BRIEF DESCRIPTION OF THE DRAWINGS

The accompanying drawings, which are included to provide a further understanding of the invention and are incorporated in and constitute a part of this specification, illustrate exemplary embodiments and together with the description serve to explain the principles of the invention.

In the drawings.

DETAILED DESCRIPTION OF THE INVENTION

Description will now be given in detail of the exemplary embodiments, with reference to the accompanying drawings. For the sake of brief description with reference to the drawings, the same or equivalent components will be provided with the same reference numbers, and description thereof will not be repeated.

Hereinafter, a glass patterned retarder stereoscopic 3D display method, and a method for fabricating the same according to the present invention will be explained in more details with reference to the attached drawings.

Figure 3:
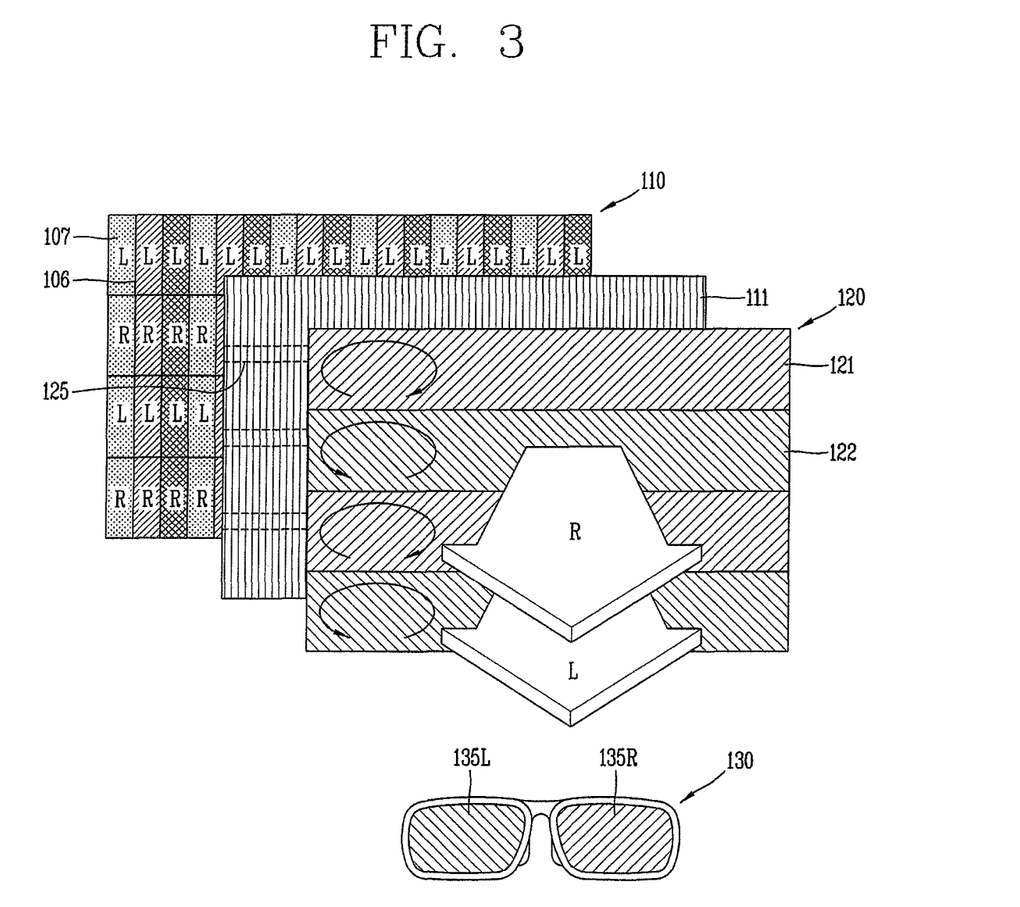
FIG. 3 is an exemplary view schematically showing a structure of a glass patterned retarder stereoscopic 3D display device according to a first embodiment of the present invention.
Figure 4:
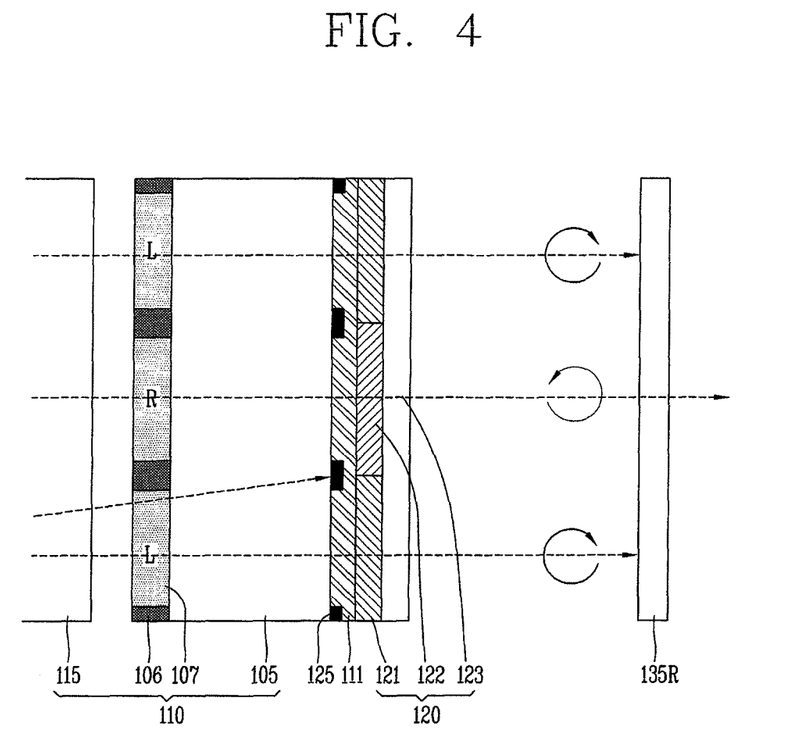
FIG. 4 is a sectional view schematically showing a structure of a glass patterned retarder stereoscopic 3D display device according to a first embodiment of the present invention.

FIG. 3 is an exemplary view schematically showing a structure of a glass patterned retarder stereoscopic 3D display device according to a first embodiment of the present invention, and FIG. 4 is a sectional view schematically showing a structure of a glass patterned retarder stereoscopic 3D display device according to a first embodiment of the present invention.

Referring to FIGS. 3 and 4, the glass patterned retarder stereoscopic method is a method for spatially separating right and left images from each other by arranging a patterned retarder 120 on a front surface of an image panel 110, using a polarization phenomenon.

The patterned retarder 120 has predetermined patterns formed at corresponding positions so that right and left images can implement polarization states perpendicular to each other.

For instance, the patterned retarder 120 is provided with a glass substrate 123, or is implemented in the form of a film. Although not shown, an alignment layer and a bi-refractive layer are formed on the glass substrate 123. The alignment layer and the bi-refractive layer are provided with regular patterns of a first region 121, and regular patterns of a second region 122. The first region 121 and the second region 122 are formed of strips alternating each other in correspondence to image lines of the image panel 110. The first and second regions 121 and 122 have different alignment directions, e.g., about 45° and 135°, respectively.

The image panel 110 may be configured as one of a Liquid Crystal Display (LCD) device, a Field Emission Display (FED) device, a Plasma Display Panel (PDP) and an Electroluminescent Display (EL) device. In case of implementing an LCD device as the image panel 110, an upper polarizing plate 111 having a light absorbing axis in a horizontal direction is disposed between the image panel 110 and the patterned retarder 120. Although not shown, a backlight unit is disposed below the image panel 110, and a lower polarizing plate is disposed between the image panel 110 and the backlight unit.

In case of implementing an LCD device as the image panel 110, the image panel 110 may include upper and lower glass substrates 105 and 115, and an LC layer formed between the upper and lower glass substrates 105 and 115. Although not shown, a thin film transistor (TFT) array is formed at the lower glass substrate 115. The TFT array includes a plurality of data lines to which R, G and B data voltages are supplied, a plurality of gate lines crossing the data lines and to which a gate pulse is supplied, a plurality of TFTs formed at intersections between the data lines and the gate lines, a plurality of pixel electrodes for charging a data voltage of LC cells, a storage capacitor connected to the pixel electrode and configured to maintain the data voltage of the LC cells, etc. A color filter array is formed at the upper glass substrate 105 (color filter substrate), and the color filter array includes a black matrix 106, a color filter 107, etc. A common electrode facing the pixel electrode and forming an electric field is formed at the upper glass substrate 105 in a vertical field driving method such as a Twisted Nematic (TN) mode and a Vertical Alignment (VA) mode. However, the common electrode is formed at the lower glass substrate 115 together with a pixel electrode, in a horizontal field driving method such as an In Plane Switching (IPS) mode and a Fringe Field Switching (FFS) mode. Alignment layers are formed on inner surfaces of the upper and lower glass substrates 105 and 115 contacting LC layers, for setting of pretilt angles. And, a column spacer for maintaining a cell gap between LC cells is formed between the upper and lower glass substrates 105 and 115.

The upper polarizing plate 111 is an analyzer attached onto a rear surface of the upper glass substrate 105 of the image panel 110, which passes therethrough only specific linearly-polarized light, among light incident after passing through an LC layer of the image panel 110. The image panel 110 having the upper polarizing plate 111 attached thereto is attached to the patterned retarder 120 by using an adhesion layer.

A widely-used 3D display method is a method for displaying right and left images on odd and even lines, or on even and odd lines, respectively. That is, as shown, 'L' images are disposed in odd lines and 'R' images are disposed in even lines in a vertical direction. Once the 'L' and 'L' images are displayed on the image panel 110, a viewer can appreciate 3D images by separately viewing the 'L' and 'R' images using 3D glasses 130.

As aforementioned, the patterned retarder 120 is provided with regular patterns of a first region 121 and regular patterns of a second region 122, the regular patterns arranged on odd and even lines in an alternating manner. For instance, the regular patterns of the first region 121 and the regular patterns of the second region 122 may be arranged on odd and even lines so as to form +45° and −45° with an absorbing axis of the upper polarizing plate 111, respectively. The regular patterns of the first region 121 and the regular patterns of the second region 122 implement phase retardation of light by +λ/4 and −λ/4, respectively, using a bi-refractive medium. A light axis of the regular patterns of the first region 121 is orthogonal to a light axis of the regular patterns of the second region 122. Therefore, the regular patterns of the first region 121 are arranged to face lines where the 'L' images of the image panel 110 are displayed, and are configured to convert light of the 'L' images to first polarized light (circularly or linearly polarized light). And, the regular patterns of the second region 122 are arranged to face lines where the 'R' images of the image panel 110 are displayed, and are configured to convert light of the 'R' images to second polarized light (circularly or linearly polarized light). For instance, the regular patterns of the first region 121 may be implemented as a polarizing filter for passing left-handed circularly polarization therethrough, and the regular patterns of the second region 122 may be implemented as a polarizing filter for passing right-handed circularly polarization therethrough.

A polarizing film for passing therethrough only a first polarizing component is attached to a left-eye lens 135L of the 3D glasses 130, and a polarizing film for passing therethrough only a second polarizing component is attached to a right-eye lens 135R of the 3D glasses 130. Therefore, a viewer wearing the 3D glasses 130 can appreciate images as 3D images by viewing the 'L' images with the left eye, and by viewing the 'R' images with the right eye.

In the present invention, the glass patterned retarder stereoscopic method is implemented as a circularly polarizing method. However, the present invention is not limited to this. That is, the glass patterned retarder stereoscopic method may be also implemented as a linearly polarizing method.

In the glass patterned retarder stereoscopic 3D display device according to a first embodiment of the present invention, light shielding patterns 125 which are called 'black strips' are formed on a rear surface of the upper glass substrate 105 between the first and second regions 121 and 122 of the patterned retarder 120, so as to solve a viewing angle in upper and lower directions.

In the 3D display method for displaying right and left images on odd and even lines, or on even and odd lines, respectively, 'L' and 'R' images adjacent to each other in upper and lower directions are separated from each other by the light shielding patterns 125, so that the 'L' images are input to the left eye and the 'R' images are input to the right eye. Especially, in the first embodiment, a width of the black matrix 106 needs not be increased in enhancing a viewing angle in upper and lower directions. And, since a distance between a viewer and the light shielding patterns 125 is reduced, an aperture ratio is prevented from being decreased.

However, when the light shielding patterns 125 are configured as resin black matrix (BM), the light shielding patterns 125 may be lost due to a polishing belt during a washing process, or it may be difficult to perform rework of the polarizing plate 111.

Figure 5:
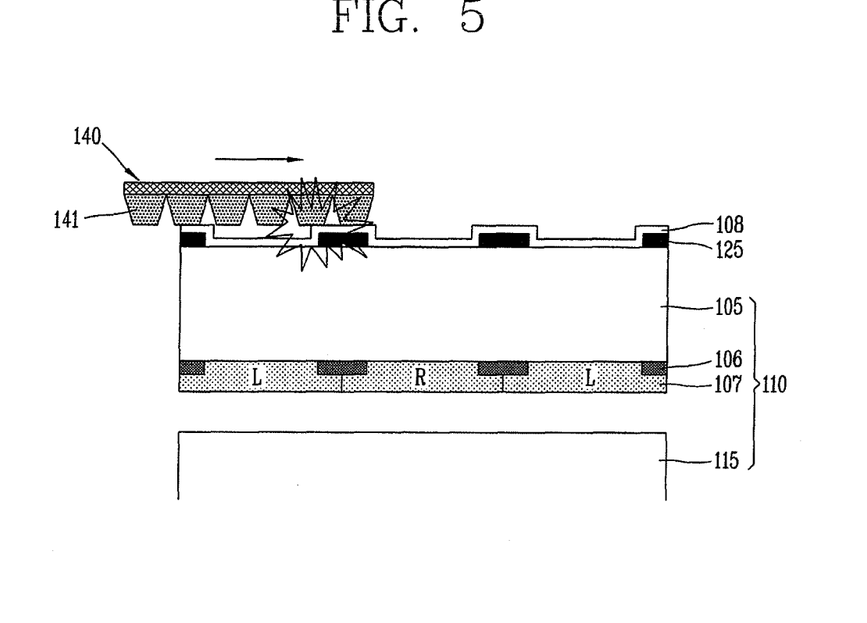
FIG. 5 is an exemplary view showing scratches occurring on light shielding patterns due to a polishing belt.

FIG. 5 is an exemplary view showing scratches occurring on light shielding patterns due to a polishing belt.

Referring to FIG. 5, the upper glass substrate 105 and the lower glass substrate 115 are formed on mother substrates of a large area. That is, a plurality of panel regions are formed on each of the mother substrates of a large area. A thin film transistor (TFT) (driving device) or a color filter layer is formed on each of the panel regions.

The image panel 110 is formed on each of the plurality of panel regions, and the upper and lower glass substrates 105 and 115 should be processed and cut so as to be implemented as a plurality of image panels 110.

In order to remove glass powder or foreign materials generated during the processing or cutting, the light shielding patterns 125 undergo a washing process using the polishing belt 140. To this end, the polishing belt 140 is provided with a polishing surface 141 formed of $Al_2O_3$ and having a hardness of about 3 H. For reference, the hardness is based on the Mohs hardness by scratch. If the hardness is based on the pencil hardness, the polishing surface 141 has a hardness of 5 H~6 H.

The light shielding patterns 125 configured as resin BM and having a hardness lower than that of the polishing surface 141 of the polishing belt 140, may have scratches thereon or may be lost due to the polishing belt 140. Especially, the light shielding patterns 125 are formed to have a thickness of about 1 µm, which may increase a probability of the occurrence of scratches due to large stair-steps.

For reference, reference numeral 108 denotes a rear indium tin oxide (ITO).

The occurrence of scratches on the light shielding patterns 125, due to the polishing belt, is prevented by forming high hardness polymer on the light shielding patterns, and thus by removing stair-steps of the rear ITO. This will be explained in more details with reference to second and third embodiments of the present invention.

Figure 6:
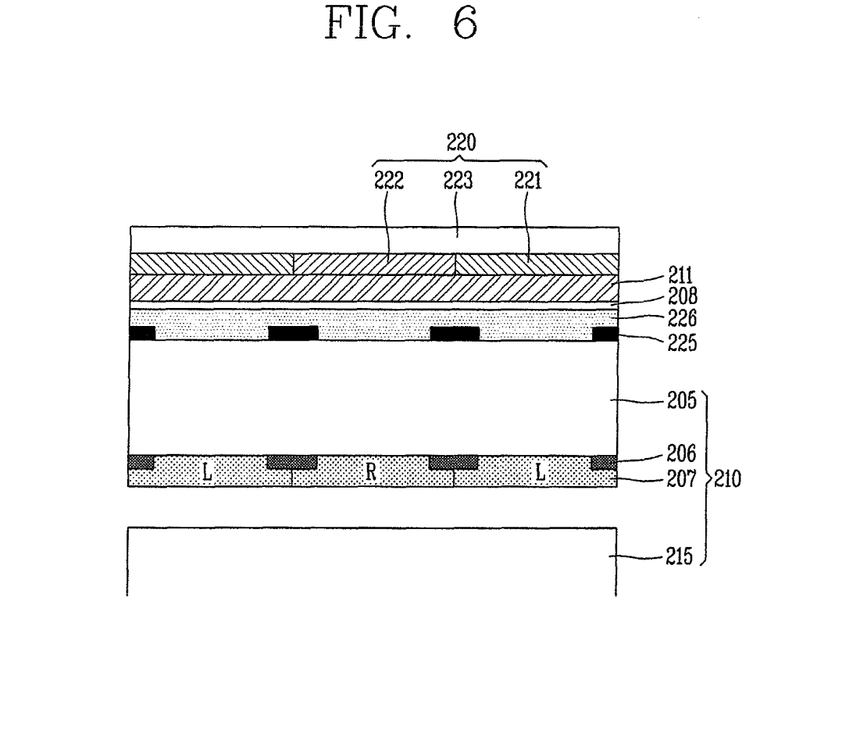
FIG. 6 is a sectional view schematically showing a structure of a glass patterned retarder stereoscopic 3D display device according to a second embodiment of the present invention.

FIG. 6 is a sectional view schematically showing a structure of a glass patterned retarder stereoscopic 3D display device according to a second embodiment of the present invention, in which high hardness polymer is formed on the light shielding patterns so that stair-steps of the rear ITO can be removed.

Referring to FIG. 6, as aforementioned, the glass patterned retarder stereoscopic method is a method using a polarization phenomenon and implemented to separate right and left images from each other by arranging a patterned retarder 220 on a front surface of an image panel 210.

The patterned retarder 220 has predetermined patterns formed at corresponding positions so that right and left images can implement polarization states perpendicular to each other.

For instance, the patterned retarder 220 is provided with a glass substrate 223, or is implemented in the form of a film. Although not shown, an alignment layer and a bi-refractive layer are formed on the glass substrate 223. The alignment layer and the bi-refractive layer are provided with regular patterns of a first region 221, and regular patterns of a second region 222. The first region 221 and the second region 222 are formed of strips alternating each other in correspondence to image lines of the image panel 210. The first and second regions 221 and 222 have different alignment directions, e.g., about 45° and 135°, respectively.

The image panel 210 may be configured as one of a Liquid Crystal Display (LCD) device, a Field Emission Display (FED) device, a Plasma Display Panel (PDP) and an Electroluminescent Display (EL) device. In case of implementing an LCD device as the image panel 210, an upper polarizing plate 211 having a light absorbing axis in a horizontal direction is disposed between the image panel 210 and the patterned retarder 220. Although not shown, a backlight unit is disposed below the image panel 210, and a lower polarizing plate is disposed between the image panel 210 and the backlight unit.

In case of implementing an LCD device as the image panel 210, the image panel 210 may include upper and lower glass substrates 205 and 215, and an LC layer formed between the upper and lower glass substrates 205 and 215.

A thin film transistor (TFT) array is formed at the lower glass substrate 215, i.e., an array substrate. The TFT array includes a plurality of data lines to which R, G and B data voltages are supplied, a plurality of gate lines crossing the data lines and to which a gate pulse is supplied, a plurality of TFTs formed at intersections between the data lines and the gate lines, a plurality of pixel electrodes for charging a data voltage of LC cells, a storage capacitor connected to the pixel electrode and configured to maintain the data voltage of the LC cells, etc. A color filter array is formed at the upper glass substrate 105 (color filter substrate), and the color filter array includes a black matrix 206, a color filter 207, etc. A common electrode facing the pixel electrode and forming an electric field is formed at the upper glass substrate 205 in a vertical field driving method such as a Twisted Nematic (TN) mode and a Vertical Alignment (VA) mode. However, the common electrode is formed at the lower glass substrate 215 together with a pixel electrode, in a horizontal field driving method such as an In Plane Switching (IPS) mode and a Fringe Field Switching (FFS) mode. Alignment layers are formed on inner surfaces of the upper and lower glass substrates 205 and 215 contacting LC layers, for setting of pretilt angles. And, a column spacer for maintaining a cell gap between LC cells is formed between the upper and lower glass substrates 205 and 215.

The upper polarizing plate 211 is an analyzer attached onto a rear surface of the upper glass substrate 205 of the image panel 210, which passes therethrough only specific linearly-polarized light, among light incident after passing through an LC layer of the image panel 210. The image panel 210 having the upper polarizing plate 211 attached thereto is attached to the patterned retarder 220 by using an adhesion layer (not shown).

In the glass patterned retarder stereoscopic 3D display device according to a second embodiment of the present invention, light shielding patterns 225 of a belt shape are formed on a rear surface of the upper glass substrate 205 between the first and second regions 221 and 222 of the patterned retarder 220, so as to solve a viewing angle in upper and lower directions, like in the first embodiment.

In the 3D display method for displaying right and left images on odd and even lines, or on even and odd lines, respectively, 'L' and 'R' images adjacent to each other in upper and lower directions are separated from each other by the light shielding patterns 225, so that the 'L' images are input to the left eye and the 'R' images are input to the right eye.

Especially, in the second embodiment, a width of the black matrix 206 needs not be increased in enhancing a viewing angle in upper and lower directions. And, since a distance between a viewer and the light shielding patterns 225 is reduced, an aperture ratio is prevented from being decreased. Therefore, a 3D picture quality can be enhanced, and costs of the backlight unit can be reduced owing to an enhanced aperture ratio.

The second embodiment is different from the first embodiment as follows. The occurrence of scratches on the light shielding patterns due to a polishing belt is prevented by forming high hardness polymer on an entire surface of the upper glass substrate 205 having thereon the light shielding patterns thereby forming a passivation layer 226, and then by forming a rear ITO 208. This can enhance processability and yield.

The passivation layer 226 is formed of high hardness polymer such as siloxane, in a thickness of 1.5 µm~5.0 µm, so that the surface of the upper glass substrate 205 having thereon the light shielding patterns 225 can be planarized. This can effectively prevent the occurrence of scratches of the light shielding patterns 225 due to a polishing belt. In this case, the light shielding patterns 225 may be formed of resin BM like in the first embodiment.

FIGS. 7A to 7E are sectional views sequentially showing a method for fabricating the glass patterned retarder stereoscopic 3D display device according to a second embodiment of the present invention shown in FIG. 6, which show a case where an LCD device includes an LC panel.

Figure 7A:
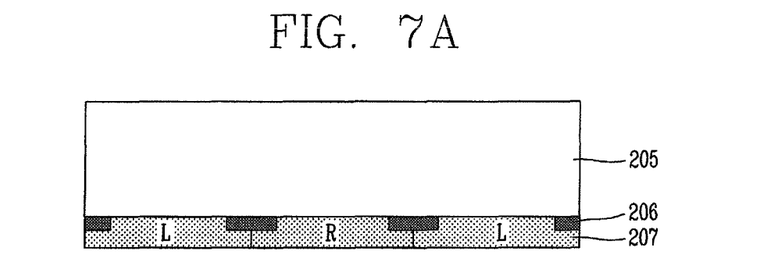
FIGS. 7A to 7E are sectional views sequentially showing a method for fabricating the glass patterned retarder stereoscopic 3D display device according to a second embodiment of the present invention shown in FIG. 6.

As shown in FIG. 7A, a color filter 207, black matrixes 206, and a transparent common electrode are formed on an upper glass substrate 205 (color filter substrate) through color filter processing. The color filter 207 includes sub color filters of RGB for implementing colors, and the black matrixes 206 are configured to separate the sub color filters from each other and to shield light passing through an LC layer. And, the common electrode is configured to apply a voltage to the LC layer. In case of implementing an LCD device operated by a horizontal field driving method, the common electrode is formed on a TFT array substrate having pixel electrodes, through array processing to be later explained.

Although not shown, a plurality of gate lines and data lines which define pixel regions are formed on a lower glass substrate (array substrate) through array processing, and a TFT connected to the gate line and the data line is formed at each of the pixel regions. A pixel electrode connected to the TFT and driving an LC layer as a signal is applied thereto via the TFT is formed through the array processing.

Figure 7B:
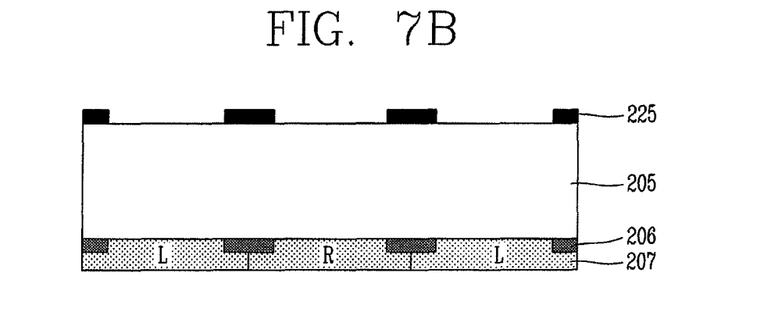

As shown in FIG. 7B, light shielding patterns 225 are formed on a rear surface of the color filter substrate 205 having undergone the color filter processing, in the form of resin BM, in a thickness of about 0.25 µm~1.5 µm.

The light shielding patterns 225 may be formed on the rear surface of the color filter substrate 205, in the form of a belt, between pixels adjacent to each other in upper and lower directions, i.e., between regions of the patterned retarder.

Figure 7C:
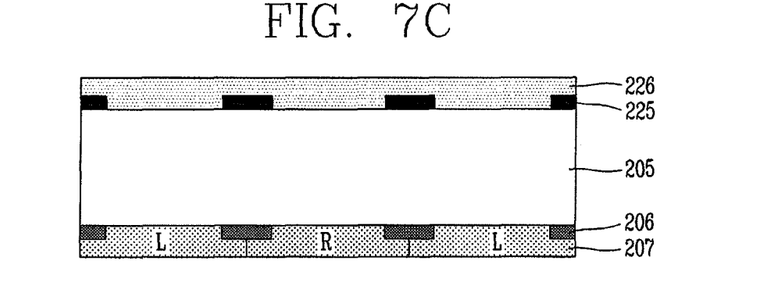

As shown in FIG. 7C, a passivation layer 226 formed of high hardness polymer such as siloxane, is deposited on an entire surface of the color filter substrate 205 having thereon the light shielding patterns 225.

The passivation layer 226 may be formed in a thickness of 1.5 µm~5.0 µm, so that the surface of the upper glass substrate 205 having thereon the light shielding patterns 225 can be planarized.

Figure 7D:
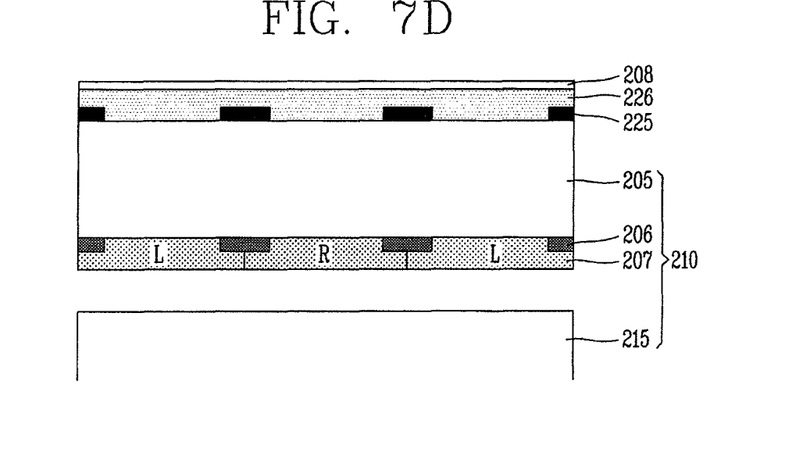

As shown in FIG. 7D, a rear ITO 208 formed of ITO is deposited on an entire surface of the passivation layer 226.

A predetermined seal pattern (not shown) formed of a sealant is disposed on the color filter substrate 205, and an LC layer (not shown) is formed on the array substrate 215 by dropping liquid crystals on the array substrate 215. Then, the color filter substrate 205 and the array substrate 215 are attached to each other to fabricate an image panel 210.

After fabricating the image panel 210 by attaching the color filter substrate 205 and the array substrate 215 to each other, the light shielding patterns 225, the passivation layer 226 and the rear ITO 208 may be formed on the rear surface of the color filter substrate 205.

Figure 7E:
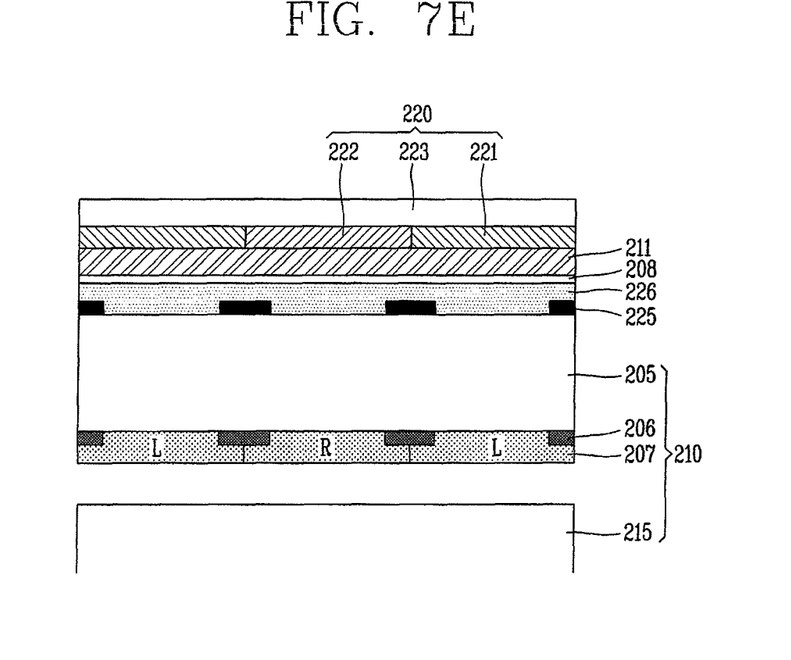

As shown in FIG. 7E, an upper polarizing plate 211 is attached onto the rear surface of the color filter substrate 205 of the image panel 210. The image panel 210 having the upper polarizing plate 211 attached thereto is attached to a patterned retarder 220 by using an adhesive layer (not shown), thereby constituting a glass patterned retarder stereoscopic 3D display device.

In the second embodiment, the light shielding patterns are formed of resin BM. However, the present invention is not limited to this. That is, the light shielding patterns may be formed of opaque metallic material, especially, high hardness metallic material. This will been explained in more details with reference to a third embodiment.

Figure 8:
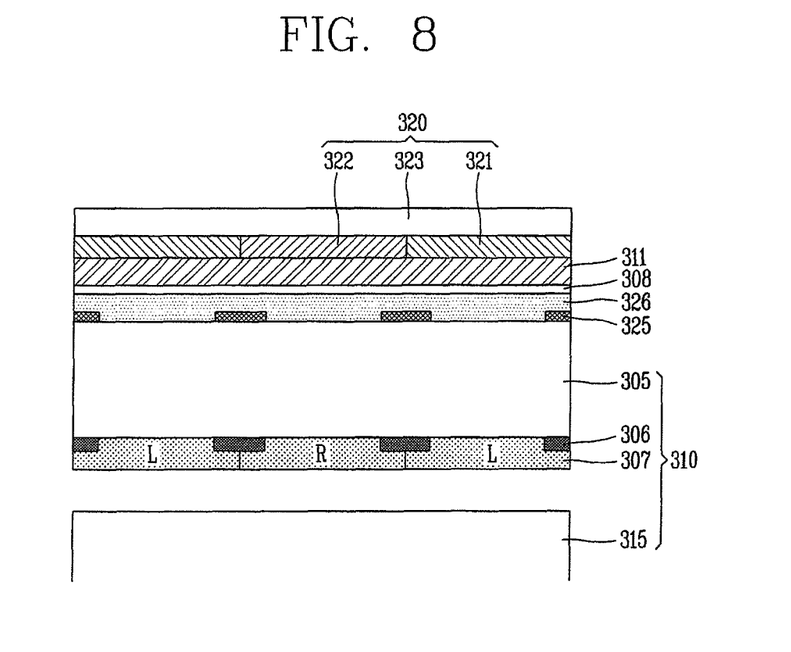
FIG. 8 is a sectional view schematically showing a structure of a glass patterned retarder stereoscopic 3D display device according to a third embodiment of the present invention.

FIG. 8 is a sectional view schematically showing a structure of a glass patterned retarder stereoscopic 3D display device according to a third embodiment of the present invention. In FIG. 8, light shielding patterns are formed of opaque metallic material, and high hardness polymer is formed on the light shielding patterns, so that stair-steps of a rear ITO can be removed.

Referring to FIG. 8, the glass patterned retarder stereoscopic 3D display method is a method for spatially separating right and left images from each other by arranging a patterned retarder 320 on a front surface of an image panel 310, using a polarization phenomenon.

The patterned retarder 320 has predetermined patterns formed at corresponding positions so that right and left images can implement polarization states perpendicular to each other.

For instance, the patterned retarder 320 is provided with a glass substrate 323, or is implemented in the form of a film. Although not shown, an alignment layer and a bi-refractive layer are formed on the glass substrate 323. The alignment layer and the bi-refractive layer are provided with regular patterns of a first region 321, and regular patterns of a second region 322. The first region 321 and the second region 322 are formed of strips alternating each other in correspondence to image lines of the image panel 310. The first and second regions 321 and 322 have different alignment directions, e.g., about 45° and 135°, respectively.

The image panel 310 may be configured as one of a Liquid Crystal Display (LCD) device, a Field Emission Display (FED) device, a Plasma Display Panel (PDP) and an Electroluminescent Display (EL) device. In case of implementing an LCD device as the image panel 310, an upper polarizing plate 311 having a light absorbing axis in a horizontal direction is disposed between the image panel 310 and the patterned retarder 320. Although not shown, a backlight unit is disposed below the image panel 310, and a lower polarizing plate is disposed between the image panel 310 and the backlight unit.

In case of implementing an LCD device as the image panel 310, the image panel 310 may include upper and lower glass substrates 305 and 315, and an LC layer formed between the upper and lower glass substrates 305 and 315.

Although not shown, a thin film transistor (TFT) array is formed at the lower glass substrate 315. The TFT array includes a plurality of data lines to which R, G and B data voltages are supplied, a plurality of gate lines crossing the data lines and to which a gate pulse is supplied, a plurality of TFTs formed at intersections between the data lines and the gate lines, a plurality of pixel electrodes for charging a data voltage of LC cells, a storage capacitor connected to the pixel electrode and configured to maintain the data voltage of the LC cells, etc. A color filter array is formed at the upper glass substrate 305 (color filter substrate), and the color filter array includes a black matrix 306, a color filter 307, etc. A common electrode facing the pixel electrode and forming an electric field is formed at the upper glass substrate 305 in a vertical field driving method such as a Twisted Nematic (TN) mode and a Vertical Alignment (VA) mode. However, the common electrode is formed at the lower glass substrate 315 together with a pixel electrode, in a horizontal field driving method such as an In Plane Switching (IPS) mode and a Fringe Field Switching (FFS) mode. Alignment layers are formed on inner surfaces of the upper and lower glass substrates 305 and 315 contacting LC layers, for setting of pretilt angles. And, a column spacer for maintaining a cell gap between LC cells is formed between the upper and lower glass substrates 305 and 315.

The upper polarizing plate 311 is an analyzer attached onto a rear surface of the upper glass substrate 305 of the image panel 310, which passes therethrough only specific linearly-polarized light, among light incident after passing through an LC layer of the image panel 310. The image panel 310 having the upper polarizing plate 311 attached thereto is attached to the patterned retarder 320 by using an adhesion layer (not shown).

In the glass patterned retarder stereoscopic 3D display device according to a third embodiment of the present invention, light shielding patterns 325 (called 'black strips') of a belt shape are formed on a rear surface of the upper glass substrate 305 between the first and second regions 321 and 322 of the patterned retarder 320, so as to solve a viewing angle in upper and lower directions, like in the first and second embodiments.

In the 3D display method for displaying right and left images on odd and even lines, or on even and odd lines, respectively, 'L' and 'R' images are separated from each other by the light shielding patterns 325, so that the 'L' images are input to the left eye and the images are input to the right eye.

In the third embodiment, a width of the black matrixes 206 needs not be increased in enhancing a viewing angle in upper and lower directions. And, since a distance between a viewer and the light shielding patterns 225 is reduced, an aperture ratio is prevented from being decreased. Therefore, a 3D picture quality can be enhanced, and costs of the backlight unit can be reduced owing to an enhanced aperture ratio.

The third embodiment is different from the second embodiment as follows. The occurrence of scratches of the light shielding patterns 325 due to a polishing belt is prevented, by forming the light shielding patterns 325 using opaque metallic material, especially, high hardness metallic material, then by depositing high hardness polymer on the light shielding patterns 325, and thereby forming a passivation layer 326. In this case, planarization of the upper glass substrate by the passivation layer 326 may be more enhanced, because the light shielding patterns 325 have a thickness smaller than that of the light shielding patterns 225 of the second embodiment. As a result, processability can be enhanced, and rework of the polarizing plate 311 can be performed since the light shielding patterns 325 are formed of metallic material. This can reduce the fabrication costs.

FIGS. 9A to 9E are sectional views sequentially showing a method for fabricating the glass patterned retarder stereoscopic 3D display device according to a third embodiment of the present invention shown in FIG. 8. In FIGS. 9A to 9E, an LCD device is implemented as an image panel.

Figure 9A:
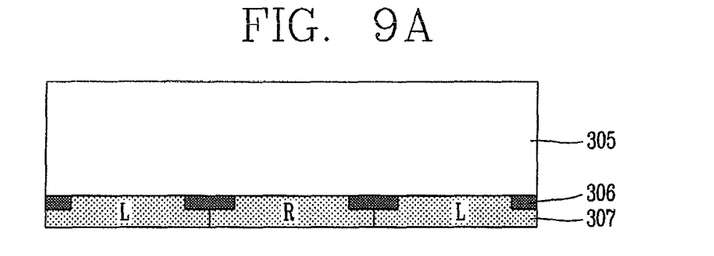
FIGS. 9A to 9E are sectional views sequentially showing a method for fabricating the glass patterned retarder stereoscopic 3D display device according to a third embodiment of the present invention shown in FIG. 8.

As shown in FIG. 9A, a color filter 307, black matrixes 306 and a transparent common electrode are formed on an upper glass substrate 305 (color filter substrate) through color filter processing. The color filter 307 includes sub color filters of RGB for implementing colors, and the black matrixes 306 are configured to separate the sub color filters from each other and to shield light passing through an LC layer. And, the common electrode is configured to apply a voltage to the LC layer. In case of implementing an LCD device operated by a horizontal field driving method, the common electrode is formed on a TFT array substrate having pixel electrodes, through array processing to be later explained.

Although not shown, a plurality of gate lines and data lines which define pixel regions are formed on a lower glass substrate (array substrate) through array processing, and a TFT connected to the gate line and the data line is formed at each of the pixel regions. A pixel electrode connected to the TFT and driving an LC layer as a signal is applied thereto via the TFT is formed through the array processing.

Figure 9B:
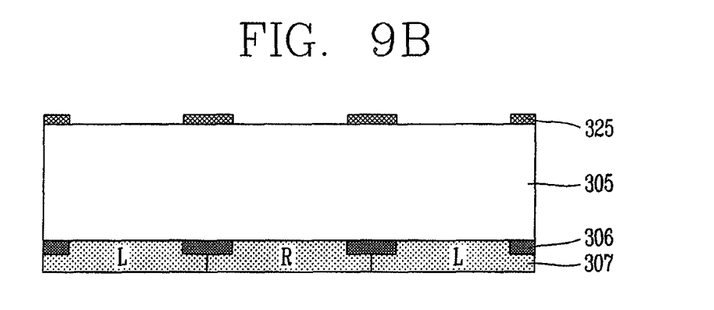

As shown in FIG. 9B, light shielding patterns 325 are formed of opaque metallic material, on a rear surface of the color filter substrate 305 having undergone the color filter processing.

The light shielding patterns 325 may be formed of high hardness metallic material, in a thickness of 300 Å~1000 Å. Here, the high hardness metallic material may include one of Cr, Fe, Co, Ta, Mo, MoTi, etc., and the hardness of the metallic material may be within the range of 5 H~10 H based on the Mohs hardness.

The light shielding patterns 325 may be formed on the rear surface of the color filter substrate 305, in the form of a belt, between pixels adjacent to each other in upper and lower directions, i.e., between regions of a patterned retarder.

Figure 9C:
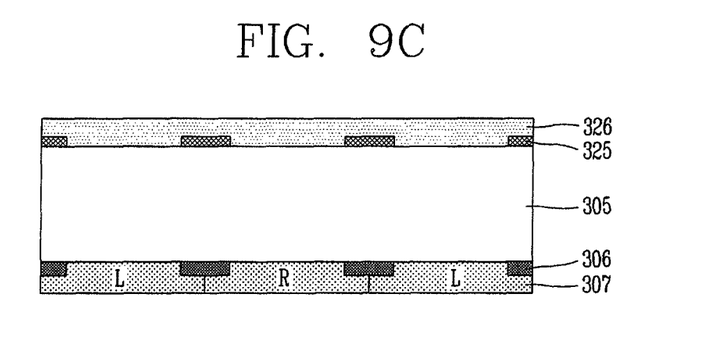

As shown in FIG. 9C, a passivation layer 326 formed of high hardness polymer such as siloxane, is deposited on an entire surface of the color filter substrate 305 having thereon the light shielding patterns 325.

The passivation layer 326 may be formed in a thickness of 1.5 μm~5.0 μm, so that the surface of the upper glass substrate 305 having thereon the light shielding patterns 325 can be planarized.

Figure 9D:
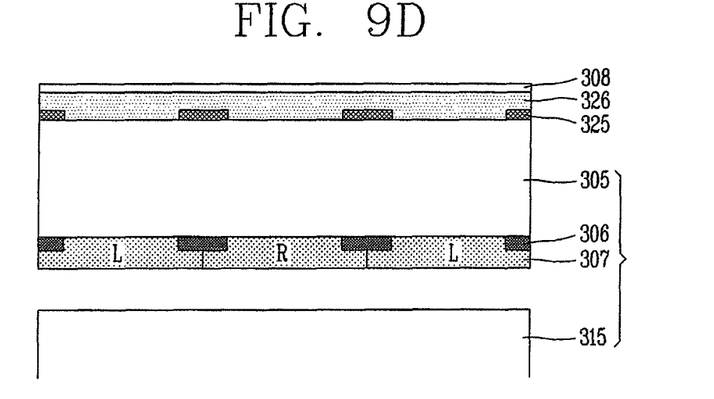

As shown in FIG. 9D, a rear ITO 308 formed of ITO is deposited on an entire surface of the passivation layer 326.

A predetermined seal pattern (not shown) formed of a sealant is disposed on the color filter substrate 305, and an LC layer (not shown) is formed on the array substrate 315 by dropping liquid crystals on the array substrate 315. Then, the color filter substrate 305 and the array substrate 315 are attached to each other to fabricate an image panel 310.

After fabricating the image panel 310 by attaching the color filter substrate 305 and the array substrate 315 to each other, the light shielding patterns 325 and the rear ITO 308 may be formed on the rear surface of the color filter substrate 305.

Figure 9E:
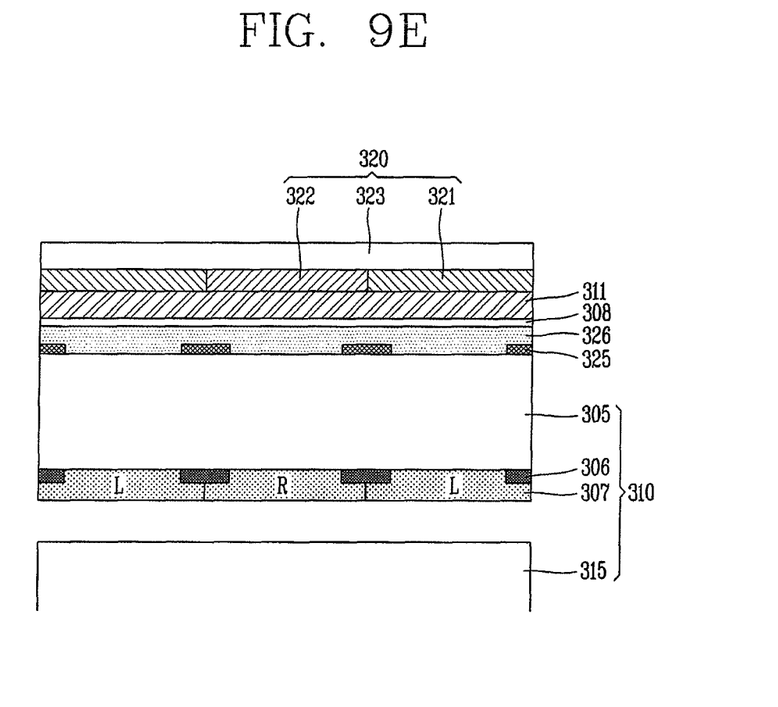

As shown in FIG. 9E, an upper polarizing plate 311 is attached onto the rear surface of the color filter substrate 305 of the image panel 310. The image panel 310 having the upper polarizing plate 311 attached thereto is attached to a patterned retarder 320 by using an adhesive layer (not shown), thereby constituting a glass patterned retarder stereoscopic 3D display device.

The foregoing embodiments and advantages are merely exemplary and are not to be construed as limiting the present disclosure. The present teachings can be readily applied to other types of apparatuses. This description is intended to be illustrative, and not to limit the scope of the claims. Many alternatives, modifications, and variations will be apparent to those skilled in the art. The features, structures, methods, and other characteristics of the exemplary embodiments described herein may be combined in various ways to obtain additional and/or alternative exemplary embodiments.

As the present features may be embodied in several forms without departing from the characteristics thereof, it should also be understood that the above-described embodiments are not limited by any of the details of the foregoing description, unless otherwise specified, but rather should be construed broadly within its scope as defined in the appended claims, and therefore all changes and modifications that fall within the metes and bounds of the claims, or equivalents of such metes and bounds are therefore intended to be embraced by the appended claims.

What is claimed is:

1. A method for fabricating a glass patterned retarder stereoscopic 3D display device, the method comprising:
    forming light shielding patterns on a rear surface of a color filter substrate, the color filter substrate having color filters and black matrixes disposed on a front surface opposite to the rear surface of the color filter substrate, wherein each light shielding pattern disposed on the rear surface of the color filter substrate corresponds to a single black matrix, respectively;
    forming a passivation layer on the light shielding patterns of the color filter substrate;
    forming a rear conductive film on an entire surface of the passivation layer;
    attaching the color filter substrate having the rear conductive film formed thereon, to an array substrate, thereby forming an image panel which displays right and left images on pixels on odd and even lines, or on even and odd lines, respectively;
    attaching a polarizing plate onto the rear conductive film of the color filter substrate of the image panel; and
    attaching a patterned retarder onto the polarizing plate, the patterned retarder configured to spatially separate right and left images from each other, the right and left images displayed through the image panel,
    wherein the right and left images adjacent to each other in upper and lower directions are further separated from each other by the light shielding patterns, and
    wherein a width of each light shielding pattern is substantially equal to a width of each corresponding black matrix.

2. The method of claim 1, wherein each of the light shielding patterns is formed on the rear surface of the color filter substrate, in the form of a rectangle, between pixels adjacent to each other in upper and lower directions.

3. The method of claim 1, wherein the passivation layer is formed of high hardness polymer including siloxane.

4. The method of claim 3, wherein the passivation layer is formed in a thickness of 1.5 μm~5.0 μm, such that the surface of the upper glass substrate having thereon the light shielding patterns is planarized.

5. The method of claim 1, wherein the light shielding patterns are formed of resin black matrixes in a thickness of 0.25 μm~1.5 μm.

6. The method of claim 1, wherein the light shielding patterns are formed of metallic material selected from a group including Cr, Fe, Co, Ta, Mo and MoTi each having 5H~10H based on the Mohs hardness.

7. The method of claim 6, wherein the light shielding patterns are formed in a thickness of 300 Å~1000 Å.

8. The method of claim 1, wherein a distance between corresponding adjacent light shielding patterns formed on the rear surface of the color filter substrate is substantially equal to a distance between adjacent black matrixes.

9. The method of claim 1, wherein a horizontal alignment of each of the light shielding patterns is equal to a horizontal alignment of each of corresponding black matrixes.

10. A glass patterned retarder stereoscopic 3D display device, the device comprising:
    an image panel including a color filter substrate and an array substrate attached to each other, and configured to display right and left images on pixels on odd and even lines, or on even and odd lines, respectively;
    light shielding patterns, each of the light shielding patterns being disposed on a rear surface of the color filter substrate between pixels adjacent to each other in upper and lower directions, the color filter substrate having color filters and black matrixes disposed on a front surface opposite to the rear surface of the color filter substrate, wherein each light shielding pattern disposed on the rear surface of the color filter substrate corresponds to a single black matrix, respectively;
    a passivation layer configured and disposed on the light shielding patterns of the color filter substrate having thereon the light shielding patterns;
    a rear conductive film attached on an entire surface of the passivation layer;
    a polarizing plate attached onto the rear conductive; and
    a patterned retarder attached onto the polarizing plate, and configured to spatially separate right and left images from each other, the right and left images displayed through the image panel,
    wherein the right and left images adjacent to each other in upper and lower directions are further separated from each other by the light shielding patterns, and
    wherein a width of each light shielding pattern is substantially equal to a width of each corresponding black matrix.

11. The device of claim 10, wherein the passivation layer is configured as high hardness polymer including siloxane.

12. The device of claim 11, wherein the passivation layer has a thickness of 1.5 μm~5.0 μm, such that the surface of the upper glass substrate having thereon the light shielding patterns is planarized.

13. The device of claim 10, wherein the light shielding patterns are configured as resin black matrixes in a thickness of 0.25 μm~1.5 μm.

14. The device of claim 10, wherein the light shielding patterns are configured as metallic material selected from a group including Cr, Fe, Co, Ta, Mo and MoTi.

15. The device of claim 14, wherein the light shielding patterns have a thickness of 300 Å~1000 Å.

16. A glass patterned retarder stereoscopic 3D display device, the device comprising:
- an image panel including a color filter substrate and an array substrate attached to each other, and configured to display right and left images on pixels on odd and even lines, or on even and odd lines, respectively;
- light shielding patterns, each of the light shielding patterns being disposed on a rear surface of the color filter substrate between pixels adjacent to each other in upper and lower directions, the color filter substrate having color filters and black matrixes disposed on a front surface opposite to the rear surface of the color filter substrate, wherein each light shielding pattern disposed on the rear surface of the color filter substrate corresponds to a single black matrix, respectively;
- a passivation layer configured as polymer and disposed on the light shielding patterns of the color filter substrate having thereon the light shielding patterns;
- a rear conductive film attached on an entire surface of the passivation layer;
- a polarizing plate attached onto the rear conductive film; and
- a patterned retarder attached onto the polarizing plate, and configured to spatially separate right and left images from each other, the right and left images displayed through the image panel,
- wherein a width of each light shielding pattern is substantially equal to a width of each corresponding black matrix.

* * * * *